(12) United States Patent
Krisnasamy et al.

(10) Patent No.: US 11,461,117 B2
(45) Date of Patent: Oct. 4, 2022

(54) SYSTEMS AND METHODS FOR LOCALIZING A USER INTERFACE BASED ON PRE-DEFINED SETTINGS STORED IN A PERSONAL STORAGE DEVICE

(71) Applicant: XEROX CORPORATION, Norwalk, CT (US)

(72) Inventors: Muralidaran Krisnasamy, Chennai (IN); Narayan Kesavan, Chennai (IN); Raj Kumar, Chennai (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/119,369

(22) Filed: Dec. 11, 2020

(65) Prior Publication Data

US 2021/0096891 A1   Apr. 1, 2021

Related U.S. Application Data (63) Continuation of application No. 15/593,352, filed on May 12, 2017, now Pat. No. 10,896,051.

(51) Int. Cl.
*G06F 9/451* (2018.01)
*G06F 9/445* (2018.01)

(52) U.S. Cl.
CPC ............ *G06F 9/454* (2018.02); *G06F 9/4451* (2013.01)

(58) Field of Classification Search
CPC ... H04L 67/125; H04L 41/0293; H04L 67/18; H04W 4/008; G06Q 30/0277; G06F 9/454; G06F 9/4451
See application file for complete search history.

(56) References Cited

U.S. PATENT DOCUMENTS

| | | | |
|---|---|---|---|
| 9,332,076 B2 | 5/2016 | Migdalovich et al. | |
| 2002/0054097 A1 | 5/2002 | Hetherington et al. | |
| 2004/0015242 A1* | 1/2004 | Brown | G05B 15/02 700/12 |
| 2005/0028078 A1* | 2/2005 | Tann | G06F 9/445 715/201 |

(Continued)

OTHER PUBLICATIONS

Scott, Ned (revised by), "HOW-TO:Install languages offline", https://kodi.wiki/view/HOW-TO:Install languages offline, 1 page (Nov. 29, 2016).

(Continued)

*Primary Examiner* — William L Bashore
*Assistant Examiner* — Gregory A Distefano
(74) *Attorney, Agent, or Firm* — Jones Robb, PLLC (57) ABSTRACT

The present disclosure discloses methods and systems for localizing a user interface of a multi-function device, based on a personal storage device of a user connected to the multi-function device, wherein the multi-function device presents a user interface in a pre-defined language. The method includes receiving the personal storage device by the multi-function device, the personal storage device includes a pre-defined setting, the pre-defined setting indicates a local language of the user. Upon receiving, the personal storage device is detected by the multi-function device. The local language of the user is detected based on the pre-defined setting stored in the personal storage device of the user. Upon detection, the pre-defined language of the user interface is automatically changed to the local language of the user.

25 Claims, 4 Drawing Sheets

(56) References Cited

U.S. PATENT DOCUMENTS

| | | | |
|---|---|---|---|
| 2008/0098138 A1* | 4/2008 | Lu | G06F 21/78 |
| | | | 710/74 |
| 2009/0328234 A1* | 12/2009 | Chou | G06F 21/10 |
| | | | 726/27 |
| 2013/0179145 A1* | 7/2013 | Patel | G06F 40/58 |
| | | | 704/3 |
| 2016/0100070 A1 | 4/2016 | Nauta et al. | |
| 2016/0170959 A1 | 6/2016 | Niles | |
| 2017/0279990 A1 | 9/2017 | Ku | |

OTHER PUBLICATIONS

"Wireless USB", https://en.wikipedia.org/wiki/WireleSS_USB; Pub. Wikipedia, The Free Encyclopedia, Wikimedia Foundation, Inc.; 11 pages (2016).

* cited by examiner

SYSTEMS AND METHODS FOR LOCALIZING A USER INTERFACE BASED ON PRE-DEFINED SETTINGS STORED IN A PERSONAL STORAGE DEVICE

CROSS-REFERENCE TO RELATED APPLICATION(S)

This patent application is a continuation of U.S. patent application Ser. No. 15/593,352, filed on May 12, 2017, which is incorporated by reference herein in their entireties.

TECHNICAL FIELD

The presently disclosed embodiments are directed to the field of user interface, and more particularly to systems and methods for localizing a user interface based on pre-defined settings stored in a personal storage device of a user.

BACKGROUND

Business devices such as a multi-function device, a photocopier machine, a scanning device, etc., allow users to perform various functions like printing, copying or scanning. With the advancement of technology, it has become a common practice in the consumer goods (or appliances) industries to configure languages in such devices/products based on geography or location where these devices are distributed, sold and/or operated. For example, if a consumer appliance (e.g., a photocopier machine) is intended to be distributed and/or sold in China, the consumer appliance is configured in Mandarin or Cantonese language. Similarly, if a consumer appliance is to be sold in Japan, the appliance is configured in Japanese language by default.

In this manner, it becomes easy for local people (i.e., people who understand Japanese language) to operate these devices but it becomes difficult for other users (users who don't understand or know Japanese language) to operate the same devices. For example, a person from United States of America goes to a particular location in Japan, where all devices are configured in a native language of Japan and wishes to operate a scanning device. Here, the user may not be able to operate the device because he does not understand or is not well versed with the Japanese language. In such a scenario, the user has to rely on local users of that particular location who understand the Japanese language, i.e., the language configured in such devices.

At times, the business devices are configured with English language since it is the often language that people attempt to speak or read but still some users may not understand it properly, hence may not be able to operate these devices. Some solutions are available to change the language of the devices. For example, manufacturers provide options to select one or more preferred languages to operate the device, however, those options involve knowing the device by reading through manuals (e.g., booklet, or digital manuals), and manually select the preferred language and then operate the device. The manual selection of the preferred language (s) by users may result in errors or may lead to discomfort to users and thus is not a desirable option. Moreover, the manual selection seems a time consuming activity. Also, if the device is already in a different language say, Japanese, then it is difficult to go till menu and change the language as the user does not understand the current language of the device. Other solutions include changing the language via voice feedback but it becomes difficult if a person is disabled or if the accent of the person is not very clear. In such cases, the voice feedback may not be helpful. In view of the above, there is a need for methods and systems to enable users to operate such devices and other electronic devices with ease, for example, in their respective local language.

SUMMARY

According to aspects illustrated herein, the present disclosure discloses a method for localizing a user interface of a multi-function device, based on a personal storage device of a user connected to the multi-function device, wherein the multi-function device presents a user interface in a pre-defined language. The method includes receiving the personal storage device by the multi-function device, the personal storage device includes a pre-defined setting, the pre-defined setting indicates a local language of the user. Upon receiving, the personal storage device is detected by the multi-function device. The local language of the user is detected based on the pre-defined setting stored in the personal storage device of the user. Upon detection, the pre-defined language of the user interface is automatically changed to the local language of the user.

According to aspects illustrated herein, a method for changing a display language of an electronic device is disclosed. The method includes receiving a storage device by the electronic device, wherein the electronic device presents a user interface in a pre-defined display language. Then, the storage device is detected by the electronic device, the storage device includes a pre-defined setting, the pre-defined setting indicates a local language of the user. The local language of the user is detected based on the pre-defined setting stored in the storage device. Then, the pre-defined display language is changed to the local language of the user. Thereafter, content of the storage device is displayed when the pre-defined display language is changed to the local language of the user. Finally, the user interface is presented in the local language of the user to perform one or more functions.

According to aspects illustrated herein, a multi-function device is disclosed. The multi-function device includes a user interface, a language database, a peripheral port and a local language detection module. The user interface is configured for presenting one or more options in a pre-defined display language of the multi-function device. The language database is configured for storing one or more patterns in one or more languages and storing one or more local languages. The peripheral port is configured for receiving a storage device of a user, the storage device includes a pre-defined setting, the pre-defined setting indicates a local language of the user. The local language detection module is configured for upon receiving, detecting the storage device by the multi-function device; detecting the local language of the user based on the pre-defined setting stored in the storage device of the user; and upon detection, automatically changing the pre-defined display language of the user interface to the local language of the user.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DESCRIPTION

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

Definitions of one or more terms that will be used in this disclosure are described below without limitations. For a person skilled in the art, it is understood that the definitions are provided just for the sake of clarity, and are intended to include more examples than just provided below.

The term "multi-function device" refers to a device or a combination of multiple devices configured to perform one or more functions, but not limited to, scanning, printing, copying, imaging, and so forth. The multi-function device includes software, hardware, firmware, or combination thereof. The multi-function device is configured to operate in a pre-defined language, English, for example. The pre-defined language is based on geography or a location where the multi-function device is sold or distributed. In the context of the current disclosure, the multi-function device is configured to detect one or more local languages based on a pre-defined setting stored in a personal storage device and accordingly change the pre-defined language of the multi-function device to the local language of the user. The multi-function device may include a number of components to perform the said functionality and this will be discussed in detail below.

The "pre-defined language" is the language in which the multi-function device is configured to operate and the pre-defined language is configured at the time of manufacturing. The pre-defined language is also called as a default language or a pre-configured language of the multi-function device. For example, the pre-defined language of the multi-function device may be, but not limited to, English. The pre-defined language is dependent on geography or location where the multi-function device is sold or distributed.

The term "local language" refers to the language which is understood or known to the user, who wishes to operate the multi-function device. Further, the local language is determined based on the personal storage device of the user or pre-defined setting in the personal storage device. The local language may also be termed as the native language of the user.

The term "user interface" is defined to include an interface shown on the multi-function device and is operable by the user to perform one or more functions such as change setting, check status, initiate scan, print, fax, print, copy, or any other functions. Here, the user interface presents an option to the user to change the pre-defined language of the multi-function device to the local language.

The term "personal storage device" of the user refers to any storage device that the user typically carries for storing data such as documents, files, folders or any other type of data. Few non-limiting examples of the personal storage device include, but not limited to, a Universal Serial Bus (USB) flash drive, a hard disk, a memory card, a SD card, a CD, or other forms of personal storage device. The personal storage device may interchangbly be used with the term "storage device," or "personal device," or "portable device."

The "pre-defined setting" is stored in the personal storage device in the form of a pre-defined folder or a pre-defined file. The pre-defined setting indicates a local language of the user. The pre-defined setting is associated with a name or includes one or more parameters indicating the local language of the user.

A "computing device" refers to any device that the user typically uses for performing his daily tasks such as laptop, a desktop, a personal computer, a mobile phone, a tablet, a personal digital assistant (PDA) or a combination thereof.

The term "server" refers to any entity or a device capable of communicating with the multi-function device and further configured for identifying the local language of the user.

Overview

Typically devices such as multi-function devices are manufactured such that the devices overall provide same kind of functionality to all users. But due to different languages adopted across the world, the manufacturers configure these devices in a language specific to a region, where these devices are sold or distributed. Most of the people are able to operate the device in a default language but some people (outside users or other users) may not be comfortable to operate the multi-function device in the default language. In order to enable users to operate the multi-function device according to their comfort or languages known to them. The user may face the same issues while using other electronic devices such as a television, a camera, a gaming console, a printer, or the like, thus the present disclosure is provided. The present disclosure provides methods and systems for localizing a user interface of a device, for example, a multi-function device. The localization is performed based on a pre-defined setting stored in a personal storage device of the user. When the personal storage device is connected to the multi-function device, the multi-function device takes cue from the personal storage device, i.e., from a pre-defined setting stored in the personal storage device and automatically changes the pre-defined language to the local language of the user.

EXEMPLARY EMBODIMENTS

Figure 1A:
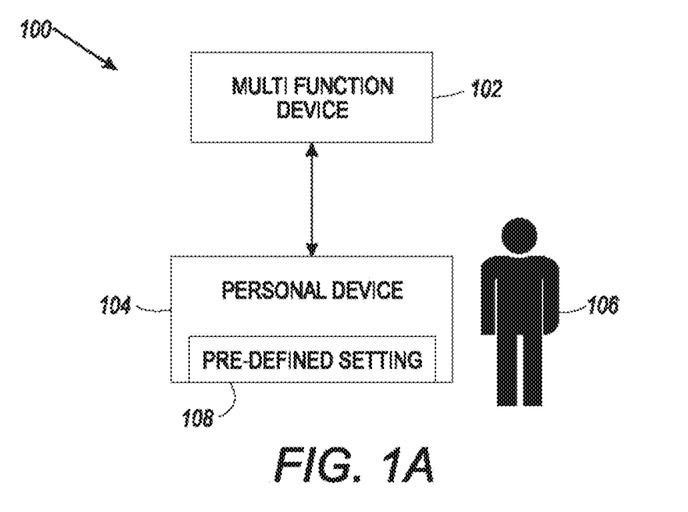
FIG. 1A and FIG. 1B are exemplary environments in which various embodiments of the disclosure can be practiced.

FIG. 1A is an exemplary environment 100 in which various embodiments of the disclosure can be practiced. References to other figures such as FIG. 1B, FIG. 2, FIG. 3, or FIG. 4 may be made while discussing FIG. 1A. The environment 100 includes a device 102 such as a multi-function device 102, a personal storage device 104 and a user 106. The personal storage device 104 is connected to the multi-function device 102 via a peripheral port such as a USB port but the personal storage device 104 may be connected via other suitable ports or connectors. Various examples of the personal storage device 104 of the user 106 may include, but not limited to, a pen drive, a hard disk, a CD, a mobile phone, an external HDD, a memory card, or a combination thereof. The user 106 operates or uses the multi-function device 102 for his day-to-day tasks such as printing, copying, imaging, scanning, or a combination of these. And the user 106 further carries the personal storage device 104 for storing his data such as documents, or any other kind of data such as videos, audios, or a combination thereof.

Figure 4:
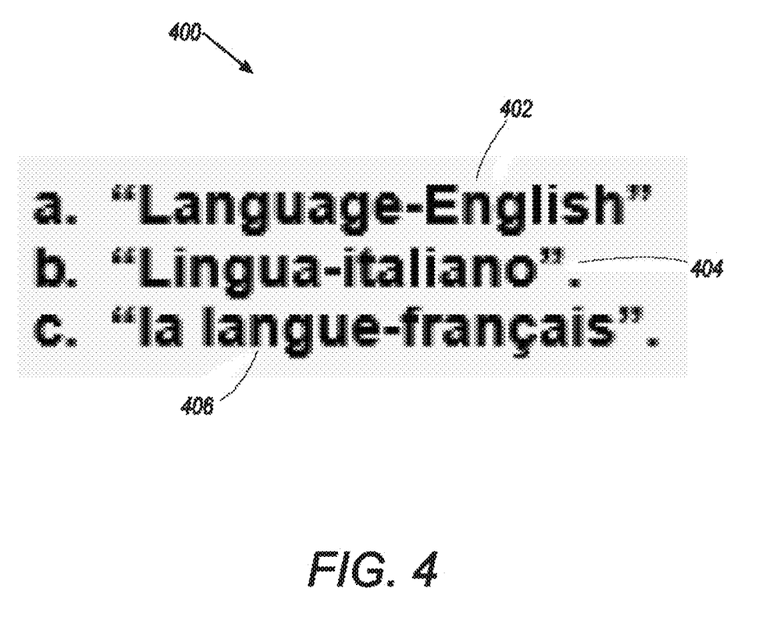
FIG. 4 shows exemplary notations associated with a pre-defined setting.

The personal storage device 104 stores documents of the user 106 such as forms, identity proof, address proof, or the like for printing. In the context of the present disclosure, the personal storage device 104 stores a pre-defined setting 108 in the form of a pre-defined folder or a pre-defined file. The pre-defined setting 108 indicates the local language of the user. In the shown embodiment of FIG. 1A, the pre-defined setting 108 is created by the user. For example, the user creates a folder having a pre-defined notation such as Insta English, where the phrase "English" denotes the local language of the user. Similarly, the pre-defined notation may be Insta Japanese, Insta Chinese or the like. In some cases, the pre-defined notation may be in the local language itself. One such example is shown in FIG. 4. As seen from the snapshot 400 of FIG. 4, various pre-defined notations are shown as 402, 404, and 406. The notation 402 indicate the local language of the user is English, the notation 404 indicates the local language of the user is Italian, and further the notation 406 indicates the local language of the user is French. The folder may include one or more files for printing, while the folder may be empty and the name of the folder simply indicates the local language of the user.

At the time of printing, the user 106 connects the personal storage device 104 to the multi-function device 102. The multi-function device 102 detects the personal storage device 104 and upon detection, the multi-function device 102 extracts the pre-defined notation associated with the pre-defined setting 108 to detect the local language of the user and automatically changes the pre-defined language to the local language of user. All pre-defined options are now shown in the local language of the user. The user can now easily use or operate the multi-function device 102.

Figure 1B:
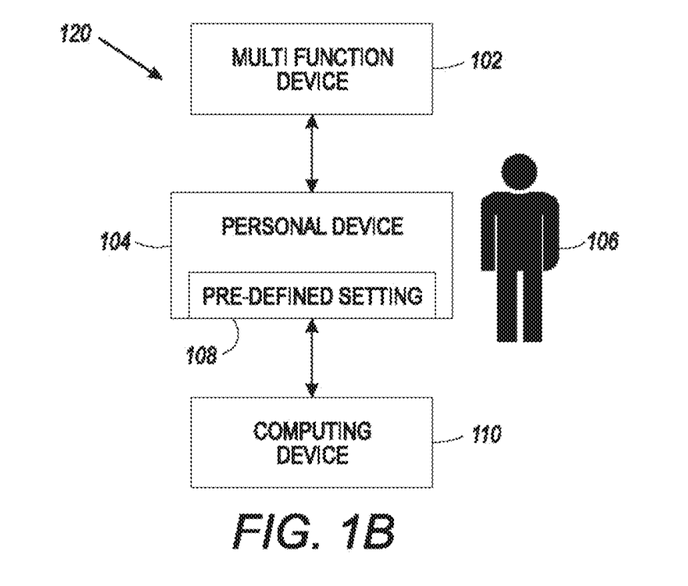

FIG. 1B shows another exemplary environment 120 in which various embodiments of the disclosure may be practiced. The environment 120 includes the multi-function device 102, the personal storage device 104, and the user 106. In this particular embodiment, the environment 120 includes an additional component such as a computing device 110. Here, the pre-defined setting 108 is automatically created by the computing device 110 as opposed to the embodiment of FIG. 1A, where the user creates the pre-defined setting 108. The pre-defined setting 108 may be a configuration file such as a text file. In other examples, the pre-defined setting 108 may be an auto run file. The pre-defined setting 108 may include one or more parameters such as operating system, operating system language, time stamp, type of computing device or the like. These parameters indicate the language of the last operating system used by the user that indicates the local language of the user. If the personal storage device 104 already contains the pre-defined setting, the computing device 110 over-writes the previous setting and creates the setting 108 in the personal storage device 104 of the user.

The computing device 110 includes an additional plug-in for creating the configuration file in the personal storage device 104. The plugin is a software pre-installed within the computing device 110. When the personal storage device 104 is plugged in the computing device 110, the plugin creates the configuration file in the USB drive with OS parameters. The user copies one or more documents from the computing device 110 to personal storage device 104. The creation of the configuration file is performed when a copy or modify operation is performed in the personal storage device 104. The multi-function device 102 reads the configuration file and verifies the last operating system language of the personal storage device 104 to detect the local language of the user. In this manner, the local language of the user is detected.

Figure 2:
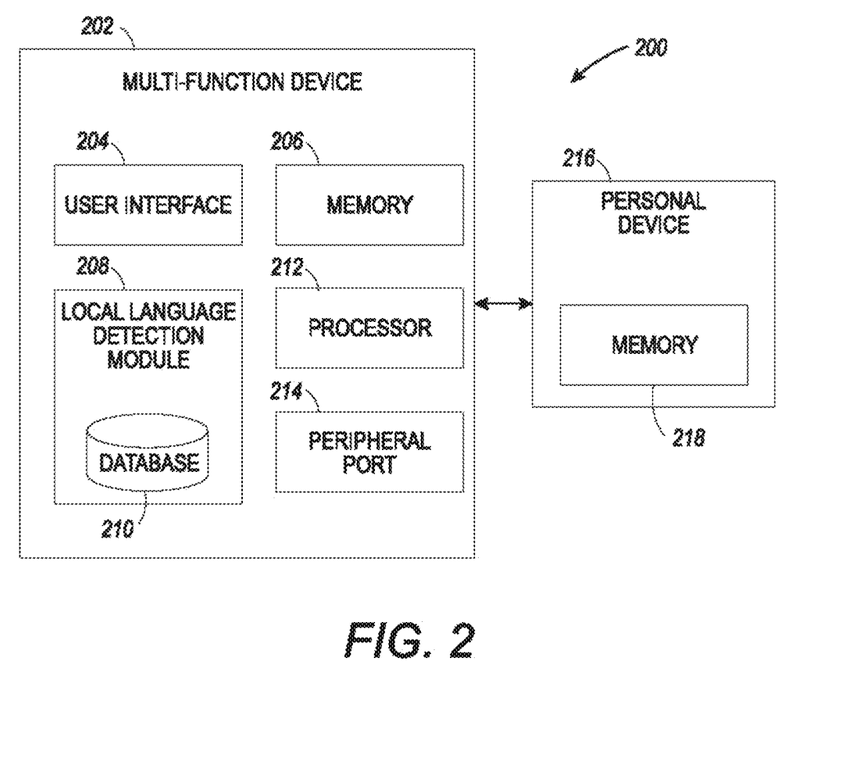
FIG. 2 is an overall system for localizing a user interface of a multi-function device.

FIG. 2 shows an overall system 200 for localizing a user interface of a multi-function device 202. References to other figures such as FIG. 1A, FIG. 1B, FIG. 3 or FIG. 4 can be made while discussing FIG. 2. As shown, the system 200 includes the multi-function device 202 and a personal storage device 216 of a user. The multi-function device 202 includes a user interface 204, a memory 206, a local language detection module 208, a database 210, a processor 212 and a peripheral port 214. The personal storage device 216 of the user includes a memory 218. Each of the components 204, 206, 208, 210, 212 and 214 are coupled to each other via a communication bus or later developed protocols and also each of the components communicate with each other for localizing the user interface 204 of the multi-function device 202. The multi-function device 202 may include one or more additional components as required to implement the current disclosure. The personal storage device 216 of the user is communicatively coupled to the multi-function device 202 via the peripheral port 214 of the multi-function device 202.

As shown, the database 210 stores one or more patterns related to various languages such as English, Italian, German, Dutch, Swedish, Romanian, Japanese, Chinese, French, Spanish or the like. Along with this, the database 210 stores one or more local languages. The database 210 may also include a sentence pattern database to generate sentences corresponding to extracted pre-defined notation. In some cases, a language model is available with the multi-function device 202 that enables the multi-function device 202 to be provided with language detection facilities. The language model is defined so as to have folder structure in different languages. One example of the structure may be [Language]-[Language name], wherein the "language" denotes the phrase language in the intended language of the user, and the "language name" denotes the intended language by the user such as English, Espagnol, Francais, Deutsch and others. For instance, if the user wants his LUI in English, the folder is named as "Language-English."

By default, the multi-function device 202 is configured to operate in a pre-defined language. The pre-defined language is based on geography where the multi-function device 202 is distributed or sold. For example, if there is a multi-function device 202 in the United States, the multi-function device 202 is operable in the language English. In another example, if the multi-function device 202 is sold in Japan, the multi-function device 202 is operable in Japanese language. The multi-function device 202 presents the user interface 204 in a pre-defined language or the default language to the user. The user interface 204 displays one or more options to the user for operating the multi-function device 202. The one or more options may relate to printing, scanning, change settings, initiate scan, or the like.

Initially, the user who wishes to use the multi-function device 202 connects the personal storage device 216 to the multi-function device 202 via the peripheral port 214. For example, the user inserts the pen drive in the USB port of the device 202. The multi-function device 202 receives the personal device 216 and detects the same upon connection.

The processor 212 triggers the local language detection module 208 for localizing the user interface 204 of the multi-function device 202. The local language detection module 208 checks for pre-defined setting stored in the personal storage device 216, the pre-defined setting is a folder or a file. The folder or the file is associated with a name in a pre-defined format and the name is given in the local language of the user. The pre-defined setting is created by the user. The user creates an empty folder in the personal storage device 216 and renames the folder name in a specific format, such as "Language-Language Name," in his known language. Various such examples are "Language-English," "Lingua-italiano," and "la langue-français." The creation of the folder is a one time activity on the personal storage device 216. The personal storage device 216 can be used on any other multi-function device to change the display language of the device. In other embodiments, the pre-defined setting is automatically created by a computing device (although not shown) of the user such as a configuration file. The configuration file may be a .txt file but other formats such as .conf file, .inf file may be implemented. The pre-defined setting includes one or more parameters that indicate the local language of the user. Based on the parameters in the configuration file, the pre-defined language is changed to the local language of the user.

To this end, the local language detection module 208 compares the extracted names against one or more patterns as stored in the database 210. In case of any ambiguous language, the entire sentence is compared with the pre-stored patterns. The language detection module 208 may use one or more language models to identify the local language. Upon suitable match, the language detection module 208 identifies the local language of the user. In other cases, the local language detection module 208 checks the configuration file to detect the local language as the configuration file contains the local language of the user. The local language detection module 208 then checks the availability of the local language with the multi-function device 202. The local language detection module 208 then retrieves the identified local language from the database 210 or the memory 206. The identified language is then installed on the multi-function device 202 and in this manner, the multi-function device 202 is configured with the local language of the user. The local language detection module 208 automatically changes the pre-defined language to the local language of the user.

As a result, all pre-defined options are then displayed in the local language of the user. For example, if the identified local language is English, then all menu options displayed earlier in Japanese are now displayed in English language. The user is now able to operate the multi-function device 202 in the local language.

In some embodiments, if the local language detection module 208 identifies more than one local language, then the local language detection module 208 provides an option to the user to change the pre-defined language of the user interface 204 to a local language. The user then selects an option and based on the user selection, the pre-defined language is changed to the local language. Once the user interface 204 is shown in the local language, the user then performs one or more functions related to printing, scanning, copying and any other function. For example, the user may want to print the documents stored in the personal storage device 216 of the user.

As shown, the memory 206 stores the electronic version of the document as well as details related to the local language of the user. The memory 206 may further include one or more language databases or may also store one or more languages. The memory may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, a compact disks (CDs), digital versatile disc or digital video disc (DVDs) and magnetic tapes.

In cases where the identified local language is not available with the multi-function device 202 or the database 210, the multi-function device 202 contacts an external device such as, but not limited to, a server such as a web server, a data server, an external storage, a cloud system, a desktop PC, a notebook, portable computer, a workstation, a mainframe computer, an internet appliance, or the like. The multi-function device 202 contacts the server via a network. The network may be a wireless network, a wired network, or a combination thereof. The network may also be an individual network or a collection of many such individual networks, interconnected with each other and functioning as a single large network, for example, the Internet or an intranet. The network may be implemented as one of the different types of networks, such as intranet, local area network (LAN), wide area network (WAN), the internet, near field communication (NFC), and such. The network may either be a dedicated network or a shared network, which represents an association of the different types of networks that use a variety of protocols. Further, the network may include network devices, such as network switches, hubs, routers, HBAs, for providing a communication link between the multi-function device and other connected devices/systems.

Exemplary Flowchart

Typically, a multi-function device is pre-configured with a language such as English, that is location or geography dependent language. As a result, all options such as an email, fax, photocopy, print, scan or the like, are presented to the user in the pre-configured language via a user interface. For example, the multi-function device may include a user interface in English language if the machine is imported/exported/sold in countries like United States of America, United Kingdom, etc., and may or may not have the option to change the language preference. Even though if the devices have language change options, those language change options as known are not desirable and are not efficient. Thus, the method is disclosed.

Figure 3:
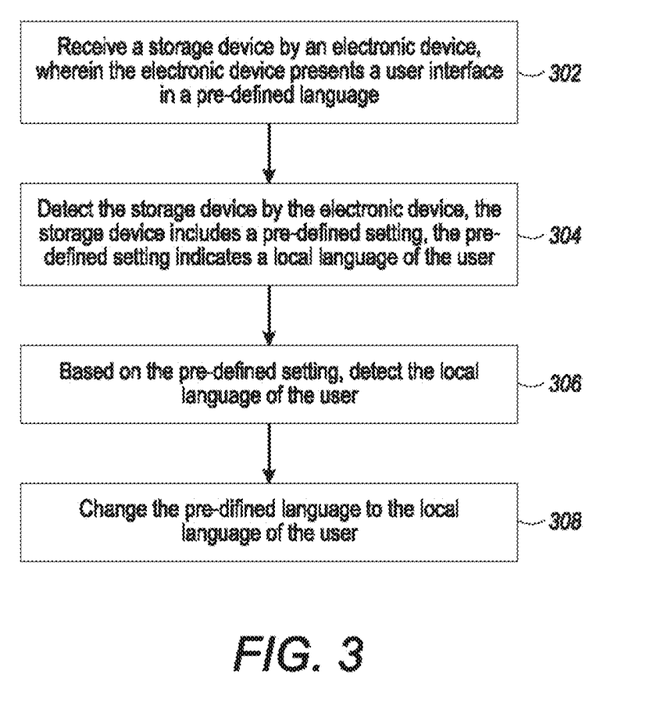
FIG. 3 shows a detailed method flowchart for localizing a user interface based on a personal storage device of a user.

FIG. 3 is a method flowchart for localizing a user interface of an electronic device. Various examples of the electronic device include, but are not limited to, a printer, a multi-function device, a gaming console, a digital camera, or the like. References to other figures such as FIGS. 1A, 1B, FIG. 2, or FIG. 4 can be made while discussing FIG. 3. To localize the user interface, the method takes cue from a personal storage device of a user, in particular to pre-defined settings stored in the personal storage device of the user. Various examples of the personal storage device may include, but not limited to, a USB stick, a thumb drive, a pen drive, a flash-disk, an SD card, an external hard drive and a USB memory. The personal storage is any external or removable device for storing data of the user. The personal storage device stores content of the user such as one or more documents, or any other data of the user. For better understanding of the disclosure, the disclosure will be discussed with multi-function device as an example, without limiting the scope of the disclosure.

To begin with, the method starts when the user connects the personal storage device to the multi-function device. The personal storage device is connected to the multi-function device via a peripheral port such as a USB port. The personal storage device is received by the multi-function device. At 302, the personal storage device is received by an electronic device such as a multi-function device wherein the electronic device presents a user interface in a pre-defined language.

At 304, the personal storage device is detected by the multi-function device. The personal storage device includes a pre-defined setting, the pre-defined setting indicates a local language of the user. The pre-defined setting may be in the form of a folder, a file or a combination thereof. In some embodiments, the folder or file may be created by the user having a pre-defined notation or a name in a pre-defined format in a local language of the user. For example, the name of the folder or file may be print insta or print-insta or the like. This is just one example, many other variations may be implemented for the current disclosure. The folder may include one or more documents which the user wishes to print. In other embodiments, the folder or file may be created automatically by a computing device. This is performed when the user connects his personal device to his computing device which he typically uses. The user uses the computing device for various purpose such as emails, chat, social networking, surfing, etc. When the user connects his personal storage device, a configuration file or an auto run file is created by the computing device, or by an operation system of the computing device. The file includes various parameters such as operating system, operating system language, device type, or time stamp. These parameters indicate the local language of the user. In case of auto run file, a pop-up message is displayed for the user to change the language. Based on the confirmation from the user, the language of the device is changed. While in the case of a configuration file, the language change functionality is performed automatically.

Then at 306, based on the pre-defined setting as stored in the personal storage device, the local language of the user is detected. If the pre-defined setting includes a folder or file as created by the user, name associated the file or folder is extracted and compared against one or more language patterns as stored with the multi-function device or over the network. In this manner, the local language of the user is identified. If the pre-defined setting is a configuration file or an auto run file as created by the computing device, then the file is parsed to detect the local language as the file contains the information related to the local language of the user.

It is then checked if the pre-defined language is different from the identified local language. If no, the method stops. Else, the local language is retrieved and downloaded. The local language is retrieved from the multi-function device if available. In some embodiments, the local language may be retrieved from a server if the identified local language is not available with the multi-function device. Thereafter, the local language is installed on the multi-function device and the local language is configured on the multi-function device. Accordingly, one or more menu options or sub-menu options are displayed in the identified local language of the user.

Then at 308, the pre-defined language is changed to the local language of the user. Thereafter, content of the personal storage device is displayed when the pre-defined language is changed to the local language of the user. The user is able to view the content of the personal storage device. For example, the user accesses the documents for one or more purposes such as for printing, scanning or copying or the like. Finally, the user interface is presented in the local language to perform one or more functions.

The present disclosure discloses methods and systems for localizing a user interface for devices (e.g., multi-function devices) based on a personal storage device of a user and has many advantages associated therein. The implementation of the disclosure does not require any hardware changes to existing devices and/or systems. Further, the disclosure can be implemented for differently abled people who can change the user interface to their convenient language or the language that is known to the user. Without much interaction with the multi-function device, the disclosure allows the user to change the default language to the local language. The methods and systems provide a smart way to customize the language of the user interface of the multi-function device to improve operability. In addition, the user is not required to know the current language of the multi-function device. Additionally, without knowing or with minimal knowledge on the current language of the multi-function device, the disclosure allows the user to change the default language to the local language of the user.

For a person skilled in the art, it is understood that the use of phrase(s) "is," "are," "may," "can," "could," "will," "should," or the like, is for understanding various embodiments of the present disclosure and the phrases do not limit the disclosure or its implementation in any manner.

It is emphasized that the term "comprises" or "comprising" is used in this specification to specify the presence of stated features, integers, steps or components, but does not preclude the addition of one or more further features, integers, steps or components, or groups thereof.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium.

For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "analyzing," or "detecting," or "displaying," or "recognizing," or "identifying," "or receiving," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for localizing a user interface of a multi-function device, based on a personal storage device of a user connected to the multi-function device, wherein the multi-function device presents a user interface in a pre-defined language, the method comprising:
receiving the personal storage device by the multi-function device when the personal storage device is inserted in a peripheral port of the multi-function device, the personal storage device storing contents including a pre-defined setting and at least one printable user file, the pre-defined setting associated with a pre-defined notation that indicates a local language of the user, the pre-defined setting including an auto run file generating a pop-up message allowing the user to change the local language stored on the personal storage device;
upon receiving, detecting the personal storage device by the multi-function device;
detecting, by the multi-function device, the local language of the user based on the pre-defined setting stored in the personal storage device that is inserted in the peripheral port of the multi-function device, the detecting of the local language including parsing the auto run file;

checking availability of the local language within the multi-function device;
retrieving the local language from the multi-function device when the local language is available on the multi-function device upon retrieval, automatically changing the pre-defined language of the user interface to the local language of the user; and
displaying content of the storage device including the at least one printable user file when the pre-defined language is changed to the local language of the user.

2. The method of claim 1, further comprising retrieving the local language from a server when the local language is not available within the multi-function device.

3. The method of claim 1, wherein the pre-defined setting is at least one of a pre-defined folder and a pre-defined file.

4. The method of claim 1, wherein the pre-defined setting is created by the user.

5. The method of claim 3, wherein the pre-defined setting is associated with a pre-defined notation to indicate the local language of the user.

6. The method of claim 1, wherein the pre-defined setting is created automatically by a computing device when the user connects the personal storage device to the computing device, before connecting the personal storage device to the multi-function device.

7. The method of claim 4, wherein the pre-defined setting is created when at least one of a copy and a modify operation is performed.

8. The method of claim 7, wherein the pre-defined setting includes type of computing device, operating system, operating system language and time stamp.

9. The method of claim 1, further comprising displaying an option to the user to change to the pre-defined language to a local language as selected by the user.

10. The method of claim 1, further comprising presenting the user interface in the local language of the user.

11. A method for changing a display language of an electronic device, comprising:
receiving a storage device by the electronic device, wherein the electronic device presents a user interface in a pre-defined display language;
detecting the storage device by the electronic device, the storage device storing contents including a pre-defined setting and at least one printable user file, the pre-defined setting indicating a local language of a user, the pre-defined setting including an auto run file generating a pop-up message allowing the user to change the local language stored on the storage device;
detecting the local language of the user based on the pre-defined setting stored in the storage device, the detecting of the local language including parsing the auto run file;
checking availability of the local language within the electronic device;
retrieving the local language from the electronic device when the local language is available on the electronic device;
changing the pre-defined display language to the local language of the user;
displaying content of the storage device including the at least one printable user file when the pre-defined display language is changed to the local language of the user; and
presenting the user interface in the local language of the user to perform one or more functions.

12. The method of claim 11, further comprising retrieving the local language from a server when the local language is not available within the electronic device.

13. The method of claim 11, wherein the electronic device includes at least one of a printer, a scanner, a multi-function device, a mobile phone, a digital camera, a television, and a gaming console.

14. The method of claim 11, wherein the pre-defined setting is at least one of a pre-defined folder and a pre-defined file.

15. The method of claim 11, wherein the pre-defined setting is created by the user.

16. The method of claim 15, wherein the pre-defined setting is associated with a pre-defined notation to indicate the local language of the user.

17. The method of claim 11, wherein the pre-defined setting is created automatically by a computing device when the user connects the storage device to the computing device.

18. The method of claim 17, wherein the pre-defined setting is created when at least one of a copy and a modify operation is performed.

19. The method of claim 18, wherein the pre-defined setting includes type of computing device, operating system, operating system language and time stamp.

20. A multi-function device, comprising:
a user interface configured for presenting one or more options in a pre-defined display language of the multi-function device;
a language database configured for storing one or more patterns in one or more languages and storing one or more local languages; a peripheral port configured for receiving a storage device of a user, the storage device storing contents including a pre-defined setting and at least one printable user file, the pre-defined setting including an auto run file generating a pop-up message allowing the user to change the local language stored on the storage device indicating a local language of the user; and
a local language detection module configured for:
upon receiving, detecting the storage device by the multi-function device;
detecting the local language of the user based on the pre-defined setting stored in the storage device of the user, the detecting of the local language including parsing the auto run file;
checking availability of the local language within the multi-function device;
retrieving the local language from the multi-function device when the local language is available on the multi-function device
upon retrieval, automatically changing the pre-defined display language of the user interface to the local language of the user; and
displaying content of the storage device including the at least one printable user file when the pre-defined language is changed to the local language of the user.

21. The multi-function device of claim 20, wherein the pre-defined setting comprises a pre-defined folder and a pre-defined file.

22. The multi-function device of claim 20, wherein the pre-defined setting is created by the user.

23. The multi-function device of claim 20, wherein the pre-defined setting is automatically created by a computing device when the user connects the storage device to the computing device.

24. The multi-function device of claim 20, wherein the local language detection module is configured for displaying an option to the user to change the pre-defined display language to the local language of the user.

25. The multi-function device of claim 20, wherein the local language detection module is configured for retrieving and downloading the local language from a server.

* * * * *